May 30, 1961 B. L. WELLER 2,985,913
APPARATUS FOR THE MANUFACTURE OF HOMOGENEOUS BODIES
Filed July 5, 1957 2 Sheets-Sheet 1
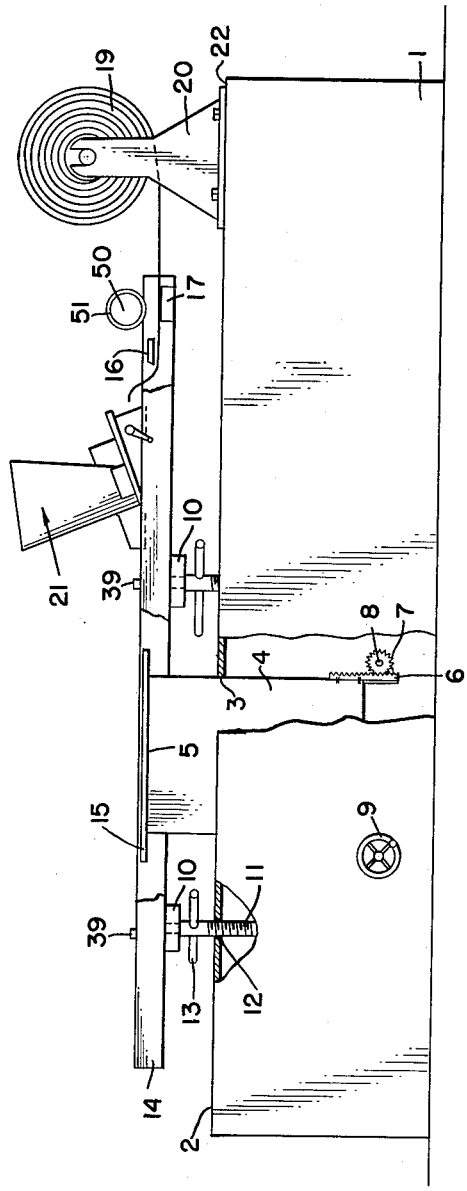
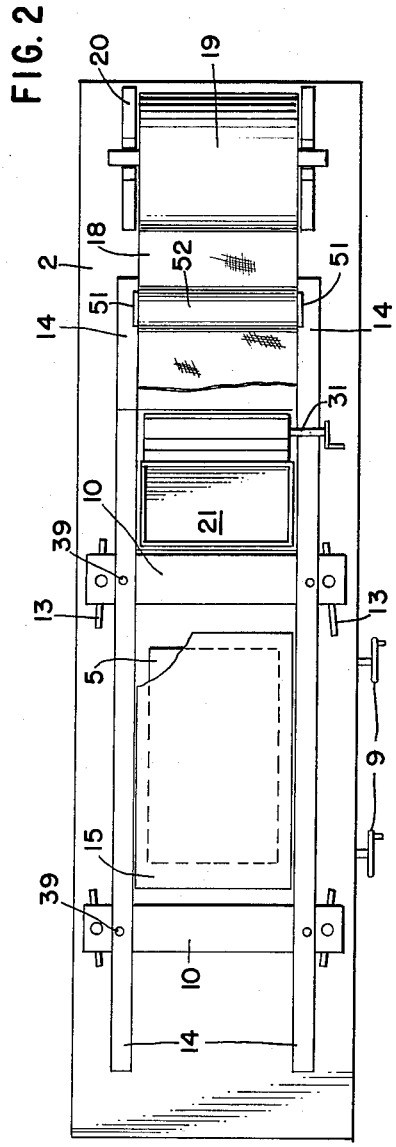
INVENTOR
BARTON L. WELLER
BY Beale + Jones
ATTORNEYS May 30, 1961 B. L. WELLER 2,985,913
APPARATUS FOR THE MANUFACTURE OF HOMOGENEOUS BODIES
Filed July 5, 1957 2 Sheets-Sheet 2
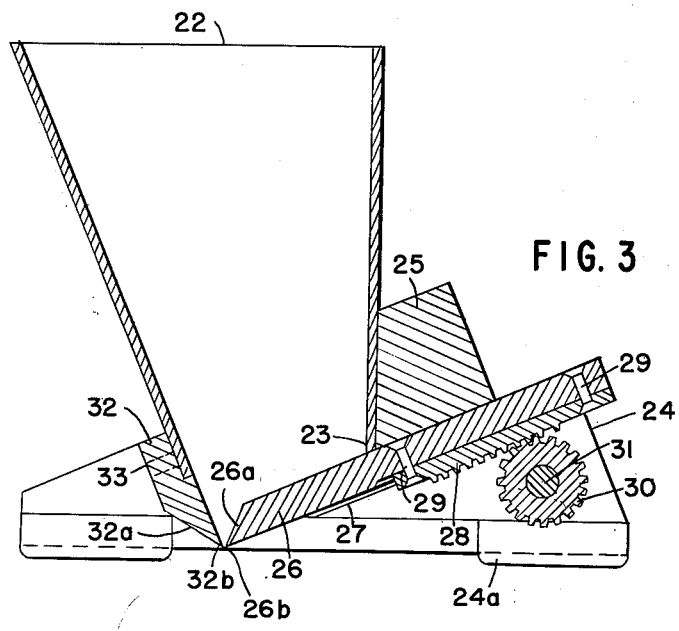
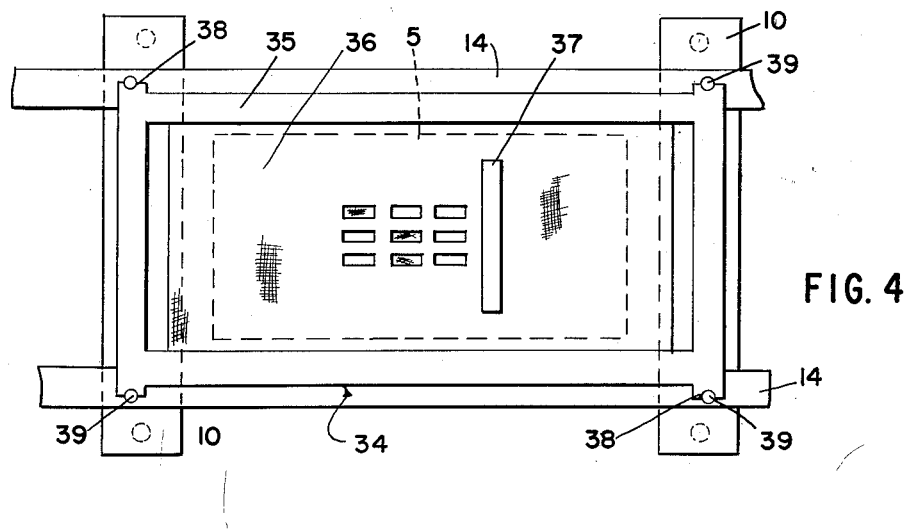
INVENTOR
BARTON L. WELLER
BY Beale + Jones.
ATTORNEYS United States Patent Office 2,985,913
Patented May 30, 1961

2,985,913

APPARATUS FOR THE MANUFACTURE OF HOMOGENEOUS BODIES

Barton L. Weller, Easton, Conn., assignor, by mesne assignments, to Vitramon, Incorporated, Monroe, Conn., a corporation of Delaware Filed July 5, 1957, Ser. No. 670,244

9 Claims. (Cl. 18—15)

This invention relates to an apparatus for manufacturing bodies composed of homogeneously distributed particles bonded to one another; such as, for example, electrical components; and, particularly capacitors, inductors, resistors, thermistors, circuits and combinations thereof. The homogeneous bodies or components produced by the apparatus of this invention may be in the form of either individual elements, each composed of built-up layers, or a plurality of the foregoing components arranged in a desired pattern in a unitary structure composed of built-up layers and electrically connected to one another so as to perform a specific function when the unitary structure is incorporated in an electrical apparatus or system. The particular properties of these electrical components are obtained through the use of materials with various electrical properties and such materials are disposed and associated in the component so as to impart specific electrical characteristics to the unit. For example, these characteristics may be imparted by the electro-magnetic characteristics of the conductors and surrounding media, as in inductors; by the dielectric properties of the non-conductors, as in capacitors; or by particular association and interconnection of electrical conductors and non-conductors among themselves and with semi-conductors which are used as resistors, thermistors, or transistors and with magnetic materials such as ferrites. The components manufactured by the apparatus comprising this invention are composed of a plurality of layers of materials mutually bonded into a continuous body.

In manufacturing components of the above-described type, the materials employed are handled as enamels, paints, pastes, suspensions, slips or slurries which are mixtures of the materials in appropriate vehicles. These mixtures are formed into a plurality of superposed layers on either a temporary or permanent base. Heretofore, the machines employed to make components of the foregoing types were constructed so that each layer was permitted to dry after being formed by evaporating the solvents through the application of heat, warm or dry air or combinations thereof to the exposed surface of each layer before the application of the next succeeding layer. When the solvents from the vehicle were thus removed, the materials were temporarily bonded into a solid film by the resins in the vehicle. The next succeeding layer was laid over the preceding layer and dried, and this cycle was repeated until the desired number of superposed layers were formed. The drying of each layer after it was formed, as described above, eliminated solvent to such an extent it left each layer in a porous or discontinuous state wherein the materials were bonded by resins but in which interstices remained. When a succeeding layer was formed over a preceding layer the occluded gases in the latter layer were displaced by solvents from the newly formed layer and the passage of the displaced gases through the newly formed layer formed a pinhole or void therein. Such a void or pinhole would perpetuate itself through a multiplicity of layers of the composite structure and produce an unhomogeneity in the layers which resulted in electrical weakness and defective units.

It is the principal object of this invention to provide an apparatus capable of manufacturing a higher proportion of electrically perfect multi-layered electrical circuit components that has been possible with machines heretofore available. Another object of this invention is to provide an apparatus for manufacturing bodies of homogeneously distributed particles bonded to one another; such as, for example, multi-layered electrical circuit components which prevents the formation of voids, striations, pinholes and similar imperfections by preventing the layers from becoming discontinuous during the building-up operation. A further object of this invention is to provide an apparatus for manufacturing bodies of homogeneously distributed particles bonded to one another which includes a dispenser for a solvent suspension of particles slidably supported for movement over a casting surface which is adjustable to permit the formation of layers of suspension of predetermined thickness and a means for feeding a solvent absorbing element over the casting surface and on the layer of suspension deposited thereon. More specifically, it is an object of this invention to provide an apparatus of the aforesaid type having a casting surface, a support therefor and guide members on opposite sides of the casting surface for guiding a dispenser over the casting surface, the casting-surface support and guide members being relatively movable to permit adjustment of the vertical spacing therebetween.

The foregoing objects of this invention are accomplished by providing an apparatus having a plate or similar surface upon which a mixture of a solvent-containing vehicle and a material having a desired electrical property may be deposited to form a layer thereof. A dispenser for said mixture is slidably mounted upon a guide member disposed adjacent the plate upon which the mixture is deposited as a layer. A supply of an absorbent material in sheet or web form is associated with the apparatus in a manner such that the leading edge of the sheet or web of absorbent material may be advanced over the deposited layer of the mixture and pressed thereupon to absorb a portion of the solvent from the vehicle. The plate upon which the layer is formed and the dispenser guide means are relatively movable, vertically, to permit movement of one of these members after each layer is formed a distance equal to the thickness of the next succeeding layer of mixture to be deposited.

The preferred embodiment of this invention is shown in the accompanying drawings wherein;

Figure 1 is a side elevational view with portions removed showing the multi-layer electrical circuit component forming machine comprising this invention;

Figure 2 is a top plan view with portions removed showing the machine depicted in Figure 1;

Figure 3 is an enlarged side elevational view in cross section showing the details of the dispenser; and Figure 4 is a fragmentary top plan view of the machine depicted in Figures 1 and 2, showing a printing device employed therewith.

Referring to Figures 1 and 2 of the drawings, the apparatus of this invention comprises a base 1 of substantial length having a flat upper surface 2. The base 1 may be of any desired form provided, however, that it has an elongated flat upper surface or top 2. Approximately midway between the ends of the top 2 an opening 3 is formed therein. A pedestal 4 is positioned in the opening 3 which extends vertically above the top 2 of the base 1. The pedestal 4 is, preferably, rectangular in cross section and is provided with a flat, horizontally disposed top surface 5. While the pedestal 4 may be stationary it is preferred that this member be vertically movable so that the top 5 thereof may be raised or lowered. The pedestal 4 may be raised or lowered by any desired means; such as, for example, by a rack 6 and pinion 7 as shown in Figures 1 and 2. The pedestal 4, thus has a plurality of racks 6 secured to the sides thereof and each rack engages a pinion 7 mounted on a shaft 8. The shafts 8 extend beyond the side of the base 1; and at the terminal ends of the shafts 8, handwheels 9 are mounted thereon which may be rotated to turn the pinions 7 which, in turn, raise or lower the racks 6 and the pedestal 4.

The machine is provided with at least two elevator bars 10—10, or supports which extend transversely across the top 2 of the base 1. The elevator bars 10—10 which are positioned near the pedestal 4 on opposite sides thereof are each supported by a pair of jackscrews 11 which extend vertically from the top 2 of the base 1. The jackscrews 11 extend through threaded openings 12 provided in the top 2 of the base 1 and are each provided with transversely extending rods 13 which may be turned to rotate the jackscrews 11 and raise or lower the latter. At their uppermost ends, each jackscrew 11 is rotatably secured to the lowermost face of the elevator bar 10 mounted thereon in order that the jackscrews 11 may be rotated and the elevator bar 11 supported thereon raised or lowered.

The elevator bars 10—10 have a pair of guide bars 14—14 secured thereto in any desired manner. The guide bars 14—14 which are preferably rectangular in cross section extend lengthwise of the base 1 and are positioned on opposite sides of the pedestal 4. The guide bars 14—14 which are permanently secured to the supporting elevating bars 10—10 may be raised and lowered with respect to the top 2 of the base 1 by raising or lowering the elevator bars 10—10, as described above. The guide bars 14—14 extend a substantial distance lengthwise over the top 2 of the base 1. Between the guide bars 14—14 a flat rectangular plate 15 is mounted on the top of the pedestal 4 which serves as a temporary or permanent base upon which the multi-layered electrical circuit components are built up. At one end of the guide bars 14—14, there are provided a pair of transversely extending members comprising an upper bar 16 and a lower bar 17. The lower bar 17 is secured at the ends thereof to the opposed sides of the guide bars 14—14 and is positioned at the bottom of the guide bars 14—14 near the ends thereof. The upper bar 16 also extends between and is secured to the opposing faces of the guide bars 14—14. The uppermost surface of the upper bar 16 is positioned below the uppermost surfaces of the guide bars 14—14, a distance greater than the thickness of any layer of the multi-layered electrical component formed with the machine. The upper and lower transverse bars 16 and 17 engage and retain the leading end of a sheet or web 18 of an absorbent material, a supply of which in the form of a roll 19, is supported on a pair of bearings 20—20 mounted on the top 2 at the adjacent end of the base 1. The absorbent sheet or web 18 is preferably an absorbent paper having good wet strength. Alternatively, absorbent textile sheets may be used; such as, for example, linen and cotton sheets. A metal roll 50 having the ends thereof reduced in size to provide transverse abutments 51—51 which engage the opposed faces of the guide bars 14—14 and a surface 52 which depends slightly between the guide bars 14—14 is mounted upon the latter.

A dispenser which is designated generally as 21 is slidably mounted on the guide bars 14—14. The dispenser 21 is shown in detail in Figure 3 and consists of a hopper 22 having an opening 23 at the lower end thereof. The hopper 22 is mounted on a frame including a pair of side plates 24—24 having flat surfaces at the lowermost ends thereof which rest upon the uppermost flat surfaces of the guide bars 14—14; and, as well, each side plate 24 has two depending portions or flanges 24a which rest against the inner faces of the guide bars 14. The flanges 24a and the first lower surfaces of the side plates 24—24 permit the dispenser 21 to move over the guide bars 14—14 from one end thereof to the other without moving transversely of the guide bars. The opening 23 in the hopper 22 is closed by a slidable gate 26, the side ends of which are fitted into slots 27 provided in the opposed faces of the side plates 24—24. On the bottom face of the gate 26 a rack 28 is secured by rivets 29. A pinion 30 which meshes with the rack 29 is mounted on a shaft 31 which extends through and is rotatably mounted in openings provided in the side plates 24—24. The end of the shaft 31 may be rotated and the rack 28 and pinion 30 thus operated to control the size of the opening in the dispenser 21. The wall of the hopper 22 adjacent the transverse bar 25 is foreshortened and a doctor blade 32 having a beveled face 32a terminating in a knife edge 32b is secured thereto by the rivets 33. The slidable gate 26 has a beveled edge 26a terminating in a knife edge 26b adjacent the knife edge 32b of the doctor blade 32. The knife edges 26b and 32b cooperate to form a narrow slit opening of a predetermined width from which the contents of the hopper 22 may be dispensed. The slidable gate 26 may be moved from a closed position to an open position having the desired opening when the dispenser 21 is used.

The apparatus of this invention is employed to manufacture multi-layered electrical circuit components by placing a mixture of a solvent-containing vehicle and a finely divided material having the desired electrical properties in the dispenser 21. A typical frit for use in making capacitors is disclosed in my United States Patent No. 2,779,975, granted February 5, 1957, as comprising the following:

| | Percent by weight | | Percent by weight |
|---|---|---|---|
| PbO | 53.2 | $LiO_2$ | 0.7 |
| $SiO_2$ | 27.1 | NaF | 4.5 |
| $K_2O$ | 2.6 | MgO | 3.6 |
| $Na_2O$ | 1.6 | SrO | 6.7 |

The above mixture is fused at a temperature in the range of 1000° C. to 1200° C. and the fluid thus formed is poured into water to cool it and reduce it to a coarse frit. The latter is ground to a fine particle size in a ball mill and is incorporated with a vehicle; such as, for example, the following:

| | Percent by weight |
|---|---|
| Turpentine | 83.5 |
| Hydrogenated rosin | 12.0 |
| Ethyl cellulose | 0.5 |
| Methyl ester of abietic acid | 2.0 |
| Diethyl oxalate | 2.0 |

The mixture contains from 20 to 30 percent by weight of vehicle and 80 to 70 percent by weight of finely divided frit.

When the dispenser 21 has been filled with a mixture such as described above, the distance between the top of the plate 15 mounted on the pedestal 4 and the opening in the dispenser 21 defined by the doctor blade 32 and the slidable gate 26 is adjusted to the thickness of the layer to be formed, usually about four thousandths (0.004) of an inch. This adjustment may be made by rotating the handwheel 9 to raise or lower the plate 15 and the pedestal 4, or, preferably, by rotating the jackscrews 11 to raise or lower the elevator bars 10—10 and the guide bars 14—14. The dispenser 21 is then moved over the guide bars 14—14; and, as it passes over the plate 15, the slidable gate 26 is opened to permit the mixture in the hopper 22 to flow therefrom and be deposited upon the uppermost surface of the plate 15 in a thin fluid layer. When the dispenser 21 passes beyond the plate 15, the slidable gate 26 is closed. Immediately thereafter the leading edge of the absorbent sheet 18 engaged between the upper transverse bar 16 and the lower transverse bar 17 is drawn between the guide bars 14—14 until it is above the layer deposited upon the plate 15. The web or sheet 18 is then progressively applied to the layer by allowing the sheet 18 to rest upon the layer at the end thereof nearest the roll 19 and then slowly and gradually applying the balance of the sheet 18 to the layer. The metal roll 50 is then moved along the guide bars 14—14 until it passes over the absorbent sheet 10 lying upon the layer in order to apply pressure to the layer. The metal roll 50 compacts the solid particles of the layer on the plate 15 and forces the solvent to the surface thereof where it is absorbed by the sheet 18. The sheet 18 is thereupon peeled from the layer; and, when entirely removed therefrom it may be torn at the upper transverse bar 16 and discarded. The absorbent sheet 18 is utilized to remove from 25 to 65 percent by weight of the solvent content of the vehicle in deposited layer. It may be necessary, therefore, to apply portions of the sheet 18 to the layer several times before the layer deposited upon the plate 15 has become compact and saturated with solvent. When the layer has been hardened as described and is free of voids, the next succeeding layer may be applied in the same manner described for depositing and compacting and adjusting the solvent content of the lower layer. The operations described may be repeated, sequentially, to build up a multiplicity of layers of material.

In the operation of forming a capacitor it is necessary to form spaced conductive layers in the multi-layered structure. Accordingly, after one or more of superposed layers have been formed a layer of a conductive material is applied to the surface of a compacted uppermost layer of ceramic material. This may be accomplished as is shown in the fragmentary view in Figure 4 of the drawings with a silk screen printing mechanism generally designated as 34. The silk screen printing mechanism 34 is of conventional design and consists of the usual box 35 provided with a screen bottom 36 in which the desired pattern is formed. A squeegee 37 is employed to force the conductive composition through the pattern provided in the screen 36 upon the upper surface of the last formed layer. The printing mechanism 34 has notched lugs 38 extending laterally from the sides of the box 35 at the four corners thereof which engage pins 39 secured to and projecting upwardly from the top of the guide bars 14—14. The lugs 38 cooperate with the pins 39 to position the printing mechanism 34 directly over the plate 15. When the conductive material has been deposited on the exposed surface of the top layer of ceramic material, the solvent in the vehicle of the conductive material is permitted to migrate into the lower layers of ceramic material and it is not necessary to apply the sheet 18 to a conductive layer. The deposited conductive layer hardens very rapidly and the operation of depositing successive upper layers of ceramic material may be resumed in the manner previously described. It will be readily apparent that any desired number of conductive layers may be interposed between the multiple layers of ceramic materials at selected points in the structure being formed. The conductive material may consist of 70 to 50 percent by weight of powdered or flake silver suspended in a vehicle composed of the following:

| | Percent by weight |
|---|---|
| Cellosolve | 85.0 |
| Ethyl cellulose | 5.0 |
| Hydrogenated rosin | 10.00 |

The apparatus of this invention may be employed to manufacture multi-layered electrical circuit components of the type described in United States Patents 2,389,419 and 2,389,420, granted November 20, 1945 to A. J. Deyrup and in my United States Patent No. 2,779,975, granted February 5, 1957. While the operation of this apparatus has been described as employing finely divided frits in a vehicle for forming non-conductive layers and finely divided silver particles in a vehicle for forming conductive layers, the apparatus may also be utilized to form multi-layered electrical circuit components of other types employing the various materials described in my aforesaid patent which are hardened by adjusting the solvent content of the deposited layers with an absorbent sheet or web.

Many other useful multi-layered structures may be manufactured with the apparatus hereinabove described. Thus strong, compact panels of high quality composed of homogeneously distributed particles of the types described which are bonded to one another may be formed. Such panels may be used in the construction of electrical equipment or they may have general architectural utility; such as, for example, as wall ceiling panels for buildings. In the latter connection, the panels may be decorated, if desired, with the printing equipment described herein.

I claim:

1. An apparatus for forming bodies composed of multiple superimposed layers of homogeneously distributed bondable particles comprising a base, a casting plate supported by said base and adapted to receive and support a layer of homogeneous slurry of solid particles suspended in a vehicle, said plate having a region of free access thereover, feeding means movable through said region of free access for depositing a single layer of said slurry on said casting plate, supporting means for said feeding means, said supporting means so positioning said feeding means relative to said plate that a build up area is defined between said feeding means and said plate having the upper surface thereof in a horizontal plane, said feeding means being operable along said horizontal plane, means carried by said supporting means for positioning a sheet of absorbent material along said horizontal plane to bring a length of said sheet material into contact with said layer, said sheet material being adapted to absorb said vehicle from said slurry and solidify said layer, and means for relatively moving said casting plate and said supporting means after said layer has been solidified whereby said feeding means is moved relative to said casting plate for reestablishing the build up area thereabove for the formation of a subsequent layer, said reestablished build up area having the upper surface thereof in a horizontal plane corresponding in relation to said feeding means with said first named horizontal plane.

2. An apparatus for forming bodies composed of multiple superimposed layers of homogeneously distributed bondable particles comprising a base, a casting plate supported by said base and adapted to receive and support a layer of a homogeneous slurry of solid particles suspended in a vehicle, a supporting means, said supporting means being so positioned relative to said plate as to provide a region of free access thereover and defining with said plate a build up area for said layer, said build up area having the upper surface thereof in a horizontal plane, feeding means carried on said supporting means and movable through said region of free access for depositing a single layer of said slurry on said casting plate in said build up area, said feeding means being operable along said horizontal plane, means carried by said supporting means for positioning a sheet of absorbent material along said horizontal plane, to bring a length of said sheet material into contact with said layer, said sheet material being adapted to absorb said vehicle from said slurry and solidify said layer, and means for relatively moving said casting plate and said supporting means after said layer has been solidified for reestablishing the build up area thereabove for the formation of a subsequent layer, said reestablished build up area having the upper surface thereof in a horizontal plane corresponding in relation to said supporting means with said first named horizontal plane.

3. An apparatus as defined by claim 2, said supporting means comprising a pair of guide bars disposed on opposite sides of said casting plate.

4. An apparatus for forming bodies composed of multiple superimposed layers of homogeneously distributed bondable particles comprising a base, a casting plate supported by said base and adapted to receive and support a layer of a homogeneous slurry of solid particles suspended in a vehicle, a supporting means, said supporting means being so positioned relative to said plate as to provide a region of free access thereover and defining with said plate a build up area for said layer, said build up area having the upper surface thereof in a horizontal plane, feeding means carried on said supporting means and movable through said region of free access for depositing a single layer of said slurry on said casting plate in said build up area, said feeding means being operable along said horizontal plane, means for supporting and feeding a supply of an absorbent sheet material adapted to absorb said vehicle from said slurry, means carried by said supporting means for guiding said sheet of absorbent material along said horizontal plane to bring a length of said sheet material into contact with said layer, and means for relatively moving said casting plate and said supporting means after said layer has been solidified for reestablishing the build up area thereabove for the formation of a subsequent layer, said reestablished build up area having the upper surface thereof in a horizontal plane corresponding in relation to said supporting means with said first named horizontal plane.

5. An apparatus for forming bodies composed of multiple superimposed layers of homogeneously distributed bondable particles comprising a base, a casting plate supported by said base and adapted to receive and support a layer of a homogeneous slurry of solid particles suspended in a vehicle, a supporting means, said supporting means being so positioned relative to said plate as to provide a region of free access thereover and defining with said plate a build up area for said layer, said build up area having the upper surface thereof in a horizontal plane, feeding means carried on said supporting means and movable through said region of free access for depositing a single layer of said slurry on said casting plate in said build up area, said feeding means being operable along said horizontal plane, means carried by said supporting means for positioning a sheet of absorbent material along said horizontal plane to bring a length of said sheet material into contact with said layer, said sheet material being adapted to absorb said vehicle from said slurry and solidify said layer, means operable along said horizontal plane for pressing said sheet material into engagement with said slurry, and means for relatively moving said casting plate and said supporting means after said layer has been solidified for reestablishing the build up area thereabove for the formation of a subsequent layer, said reestablished build up area having the upper surface thereof in a horizontal plane corresponding in relation to said supporting means with said first named horizontal plane.

6. An apparatus as defined by claim 5, said means for pressing said sheet material into engagement with said slurry being movably carried by said supporting means and being operable progressively along said first named horizontal plane.

7. An apparatus as defined by claim 5, said supporting means comprising a pair of guide bars disposed on opposite sides of said casting plate.

8. An apparatus as defined by claim 7, said means for pressing said sheet material into engagement with said slurry comprising a roller carried by said guide bars.

9. An apparatus for forming bodies composed of multiple superimposed layers of homogeneously distributed bondable particles comprising a base, a casting plate supported by said base and adapted to receive and support a layer of a homogeneous slurry of solid particles suspended in a vehicle, a supporting means, said supporting means being so positioned relative to said plate as to provide a region of free access thereover and defining with said plate a build up area for said layer, said build up area having the upper surface thereof in a horizontal plane, feeding means carried on said supporting means and movable through said region of free access for depositing a single layer of said slurry on said casting plate in said build up area, said feeding means being operable in said horizontal plane, means carried by said supporting means for feeding a sheet of absorbent material along said horizontal plane to bring a length of said sheet material into contact with said layer, said sheet material being adapted to absorb said vehicle from said slurry and solidify said layer, means fixedly positioned with respect to said supporting means for removably supporting printing means for operation in said horizontal plane, and means for relatively moving said casting plate and said supporting means after said layer has been solidified for reestablishing the build up area thereabove for the formation of a subsequent layer, said reestablished build up area having the upper surface thereof in a horizontal plane coersponding in relation to said supporting means with said first named horizontal plane.

References Cited in the file of this patent
UNITED STATES PATENTS

| | | |
|---|---|---|
| 1,711,849 | Greenberg | May 7, 1929 |
| 2,183,965 | Ledeboer | Dec. 19, 1939 |
| 2,436,176 | Novello | Feb. 17, 1948 |
| 2,482,094 | Chavannes et al. | Sept. 20, 1949 |
| 2,577,275 | Sampson et al. | Dec. 4, 1951 |
| 2,642,628 | Zimmerman | June 23, 1953 |
| 2,734,249 | Willis | Feb. 14, 1956 |
| 2,779,975 | Lee et al. | Feb. 5, 1957 |